United States Patent [19]

Chan

[11] Patent Number: 4,746,946
[45] Date of Patent: May 24, 1988

[54] MINIATURE CAMERA SHUTTER MECHANISM

[75] Inventor: Kwok Y. Chan, North Point, Hong Kong

[73] Assignee: W. Haking Enterprises Limited, North Point, Hong Kong

[21] Appl. No.: 61,536

[22] Filed: Jun. 11, 1987

[51] Int. Cl.[4] .............................................. G03B 9/10
[52] U.S. Cl. .................................... 354/250; 354/206
[58] Field of Search ................ 354/204, 206, 250, 251

[56] References Cited

U.S. PATENT DOCUMENTS 3,906,530  9/1975  Oshima .................................. 354/206
3,943,536  3/1976  Oshima .................................. 354/204

Primary Examiner—L. T. Hix
Assistant Examiner—Brian W. Brown
Attorney, Agent, or Firm—Russell E. Hattis; Stephen R. Arnold

[57] ABSTRACT

A simplified miniature camera features a spring-actuated shutter-striking slider member having a film-engaging finger integral therewith for engaging a film during film advance to move the striker member to an energized position. The slider member energizing spring is disposed to provide not only translational urging to the slider member, but also rotational urging to provide such film engagement. The film engaging member, as well as an arresting pawl configured to arresting engage the takeup spool gearing drive are all integral in a one-piece slider member slidably mounted to a post in the camera body. Exposure is initiated by operator actuation of a rotatable control member rotating the sliding member to disengage the film-engaging finger from its captured state in a film perforation, thereby releasing the slide to strike an impulse shutter. Subsequent rotation of the slider member of the slider energizing spring not only rotates the slider and the film-engaging finger into engagement with a film perforation, but also returns the shutter control system to its dormant state without the necessity for an additional return spring. In one embodiment, a pair of sear portions are formed, one on the camera body, and the other integral with the slider member, and may form either an auxiliary cocking latch for testing the camera with no film in place, or in the alternative, as the normal shutter release latch.

6 Claims, 7 Drawing Sheets

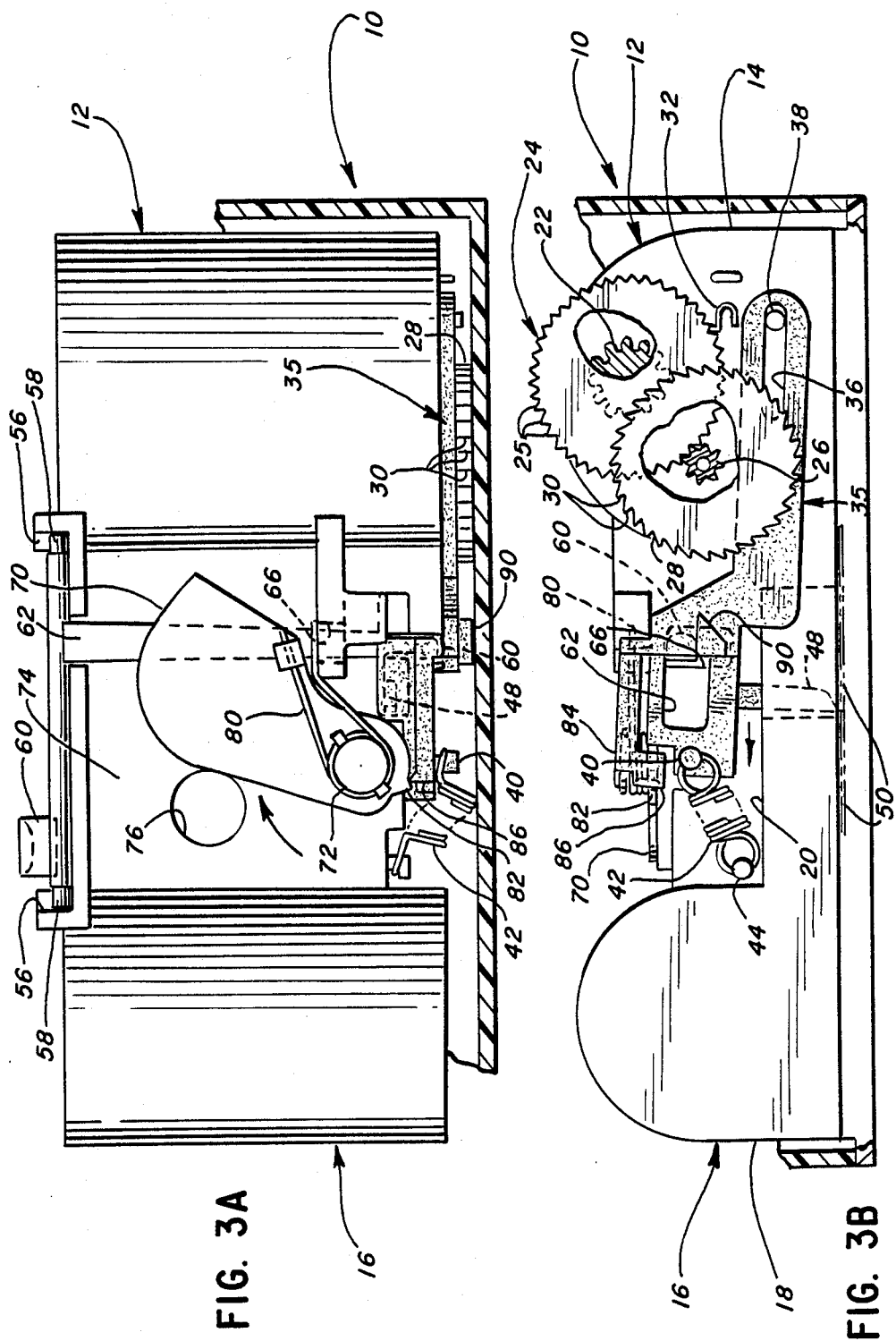

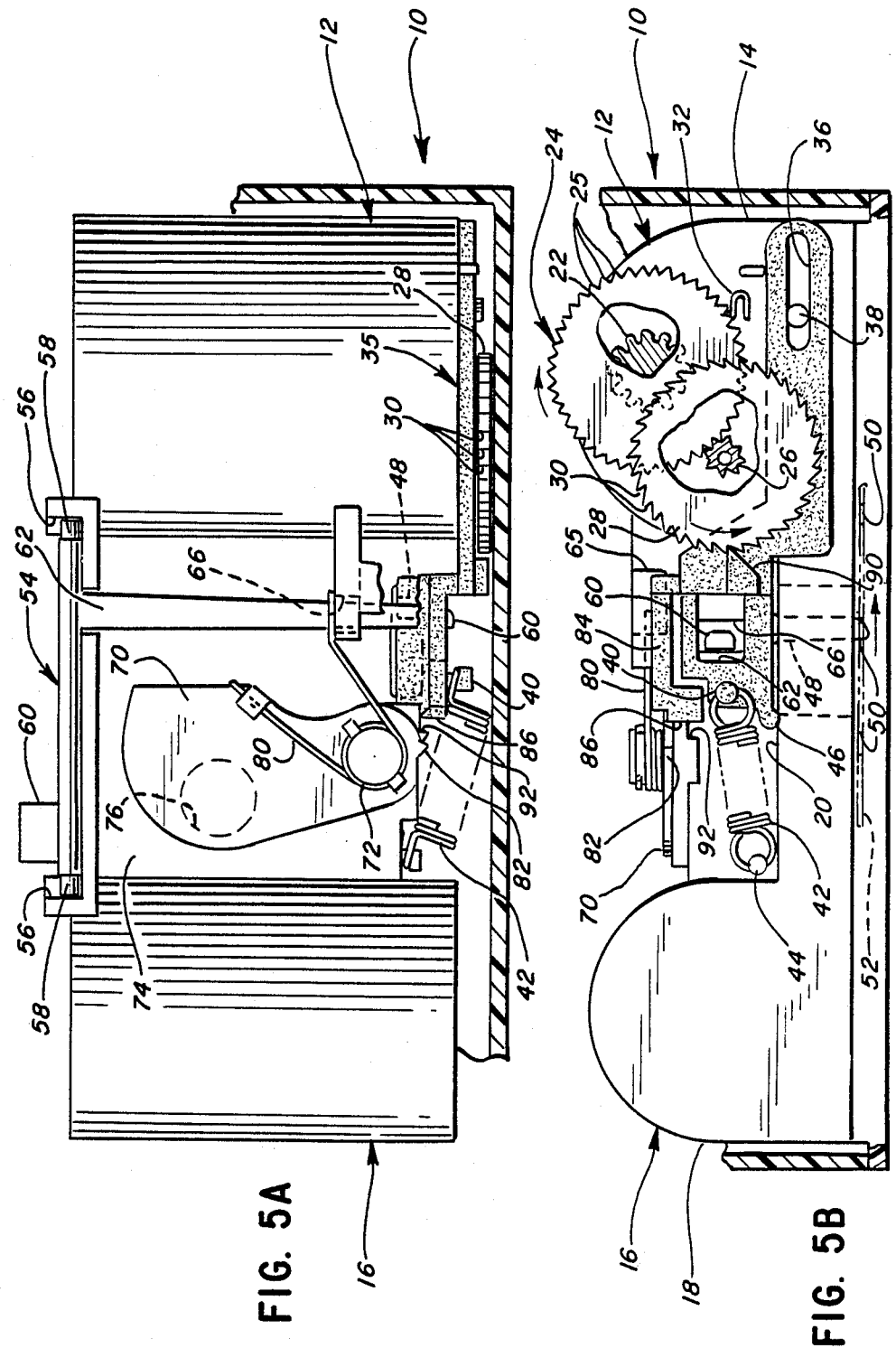

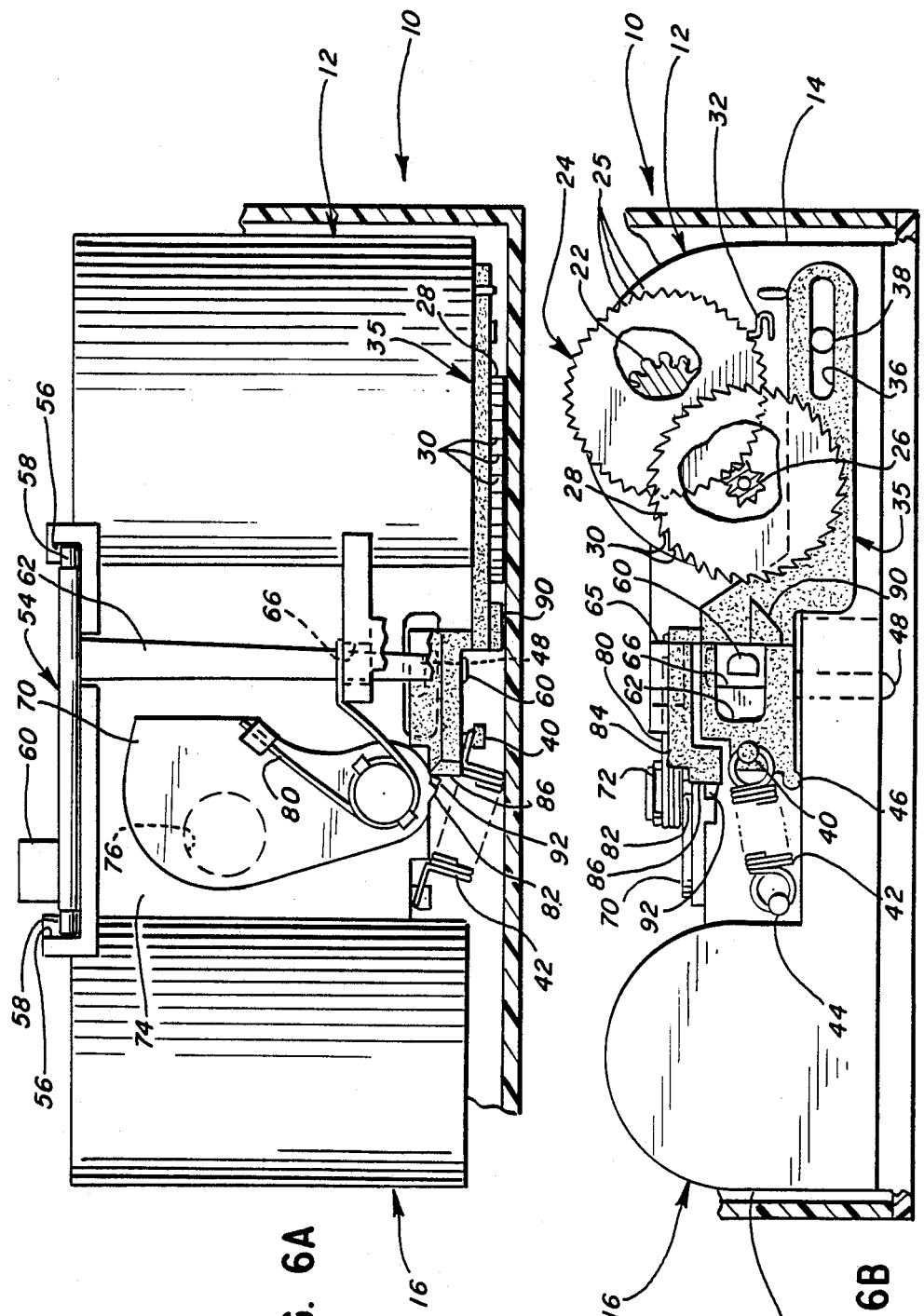

MINIATURE CAMERA SHUTTER MECHANISM

DESCRIPTION

Technical Field

The technical field of the invention is the still camera art, and in particular, shutter cocking and release systems.

BACKGROUND OF THE INVENTION

Among the least expensive of the cameras available on the market today are miniature cameras specifically designed to take a two-lobed film cassette, one lobe containing a roll of film and the other containing a takeup spool having a film leader attached thereto. The two lobe-shaped chambers are joined by a channel member presenting the emulsion side of the film to the camera when the cassette is installed into a film-accepting chamber therein. Such films are commonly marketed in the United States under, for example, the Eastman Kodak trademark "110". Such cameras are often characterized by extreme simplicity, and are cost-engineered for the mass market. To achieve the necessary cost competitiveness, efforts are constantly being made to reduce the shutter cocking and shutter release mechanisms to the simplest, least expensive forms possible.

Probably the simplest of these is such a camera marketed by Asanuma Company of Tokyo under the trademark TOREL. The film advance and shutter release mechanism is characterized by extreme simplicity. A slider member is urged by a slider member energizing spring from a cocked, energized position to a released position. The slider member is slidably supported on a movable rail. Upon release from the energized position, the slider member is urged at high speed towards an anvil extension of an impulse-type shutter blade. The striker portion on the slider member then strikes this anvil portion in passing to flip the shutter through an exposure cycle. Film advance is secured by a rotatable thumb wheel having a gear attached thereto, the gear being disposed to extend into the dispensing chamber of the camera housing. This gear in turn is disposed to drivingly engage a similar gear provided on the takeup chamber of the cassette so as to drive the takeup spool in a film-advancing direction. Rotation of the film wheel thus advances the film.

A shutter release mechanism consists of a spring-loaded shutter release button which is coupled at one end of the slider member mounting rail to urge the rail from a dormant to a picture-taking position. The slider member has further affixed thereto a cocking member in the form of a finger-like projection configured to extend from the camera interior through the film plane, and is further disposed so that it will engage the film along a line adjoining the edge perforations thereof. In the abance of operator pressure on the shutter button, the shutter button spring urges the rod and thus the slider and the aforementioned extension into contacting engagement with the film. As the film is advanced the next frame by thumb wheel rotation, the film-engaging finger will enter a film perforation under the urging of the pushbutton spring, to be urged against the increasing form of the slider member spring to a fully energized position. Release of the slider member occurs upon depression of the shutter button causing the film-engaging member to withdraw beyond the plane of the film, whereupon the capture is lost, and the spring drives the slider member to strike the shutter.

The camera is further provided with a one-way spring-loaded pawl engaging toothed surfaces on the film wheel so that the the takeup spool can only be rotated in a film-advancing direction. Film advance termination is secured by providing another element of the slider member disposed to strikingly engage the pawl at the end of film advance, thereby forcing the pawl into a sufficiently strong engagement with the teeth of the film wheel to prevent further rotation thereof.

The above mentioned system has several disadvantages. The slider member, the film-engaging finger, and the pawl-engaging portion are all separate elements riveted together, and thus represent an expensive piece-parts manufacturing operation. Additionally, three springs are necessary, the slider energizing spring, the pawl spring, and the pushbutton return spring (in addition to the mandatory shutter return spring). A further reduction in the number of necessary parts which must be assembled to build the camera remains a desirable objective. Additionally, with no film in the camera there is no way of cocking it to make sure that the shutter release system is operating. There thus remains a need for a simple inexpensive solution to the problem of providing for some means for cocking the shutter so that the operator may test the entire system with no film in the camera. Most preferably such an auxiliary cocking system should not require the addition of a single extra part to the camera.

SUMMARY OF THE INVENTION

The camera of the present invention features a unitary one-piece shutter-striking slider member having a guide slot at one end thereof captively engaged by a post integral with the camera body so as to be translatable and rotatable, so that a film perforation engaging member integral therewith may be rotated. With the film fully advanced and the slider member energizing spring extended, shutter actuation is achieved by a pushbutton-operated rotatable member having one end loosely captive in the slider member and disposed so that operator pressure applied thereto will urge it into contact with a portion of the slider member and urge it into rotation to extract the film engaging member from the film perforation. According to a feature of the invention, the single spring urges this slider member from an energized position into a linear motion so as to strikingly actuate the shutter by means of a shutter-striking portion integral with the slider, and further rotatingly urges the slider so as to force the film-engaging member again into contact with the film. Upon subsequent film advance, presentation of a film perforation opposite the end of the film-engaging member allows the slider spring to rotate the slider so that the film-engaging member is captured to move the slider back towards an energized position.

Thus, by properly orienting the slider energizing spring, not only is the slider urged into proper linear actuation for exposure, but also is returned to the film-engaging position, and further returns the exposure button system to its normal dormant condition. The necessity for a separate exposure button return spring is eliminated According to related features of the invention, film advance is terminated by a portion of the slider member disposed for engagement of thumb wheel gearing which drives the cassette takeup spool. According to a further related feature of the invention, the slider member is fabricated from a one-piece, preferably injection-molded element having the shutter anvil striking portion, the film engaging extension member, the pawl for engaging the thumb wheel gearing, and the slider linear motion guide all configured as a one piece integral unit.

This is to be contrasted with the relatively complex separate guide rail, multipiece slider and shutter button return spring system of the prior art, described in the Background of the Invention. A substantial parts economy, as well as simplification of assembly, is therefore provided, contributing to reduced camera cost.

According to another independently claimed feature of the invention, a sear is provided having one sear portion mounted on the camera housing and the other mounted on the slider member, and preferably integrally therewith, so as to be placed in a confronting latching relationship with the slider member in an unrotated, energized position. The user is thus able to test the complete shutter release system simply by manually moving the film-engaging member sufficiently towards an energized condition that the sear faces are in opposing confronting relationship. Release of finger pressure then allows the slider member to be moved by the spring towards the stationary sear portions so that the two sear portions engage to latch the slider member. Operation of an exposure button then urges the slider to rotate to bring the sear portions out of confronting relationship, whereupon an exposure cycle is initiated.

According to a related feature of the invention, by configuring the stationary sear portion with an adequately wide face, and by providing a slight amount of rearward travel in the film advance gearing after release of operator pressure therefrom, the slider spring will urge the film slightly backwards after film advance, whereupon the sear faces will engage to prohibit further rearward travel. Tensile stresses are thus relieved from the film. Because of the wider sear face, attendant to the rotation of the slider member during exposure operation, the film advancing member will withdraw from the film before the sear portions disengage. Thus a more positive and uniform release of the slider member is achieved, requiring of no additional piece-parts in the camera.

Other features and aspects of the invention will become apparent upon making reference to the specification, claims, and drawings to follow.

DESCRIPTION OF THE DRAWINGS

FIGS. 3A and 3B are partially cutaway rear and bottom views, respectively, of the camera shutter mechanism showing the camera mechanism near the end of the shutter actuation stroke.

FIGS. 5A and 5B are partially cutaway rear and bottom views, respectively, of the camera shutter mechanism showing the terminal phase of film the film advancing mechanism arrested.

FIGS. 6A and 6B are partially cutaway rear and bottom views, respectively, of the camera shutter mechanism showing the mechanism held in a cocked condition with no film present.

DESCRIPTION OF THE INVENTION

Figures 1A, 1B:
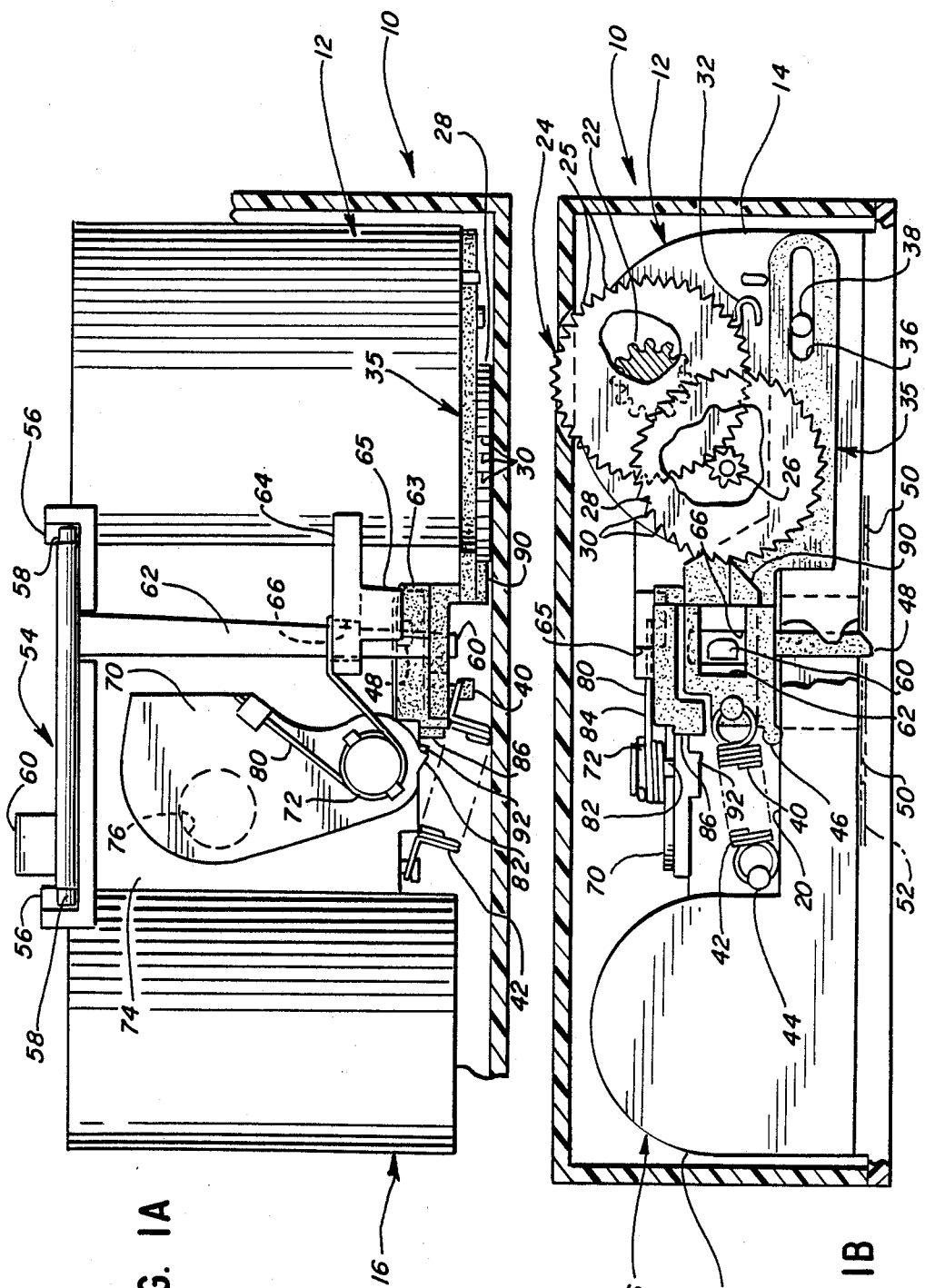
FIGS. 1A and 1B are partially cutaway rear and bottom views, respectively, of the camera shutter mechanism in the cocked state.

Referring now to the figures, FIGS. 1A and 1B show the principal elements of a shutter cocking and film advance system of a camera 10 adapted to received a miniature cassette of the type marketed under the trademark "110" by the Eastman Kodak Corporation of Rochester, N.Y. As is now commonly known, such cassettes have a generally lobe-shaped film dispensing chamber having the film pre-loaded therein and a similarly lobe-shaped takeup chamber, the two chambers being joined by a generally rectangular joining channel along which the film is fed. The camera 10 shown in the figures is configured to accept such a cartridge into a takeup chamber 12 having an outer wall 14, and a dispensing chamber 16 having an outer dispensing chamber wall 18. These two chambers are joined by a transverse chamber defined in part by an interior wall 20. Such cassettes have integral therewith an externally accessible drive gear, rotation of which will serve to drive the takeup spool in a film advancing direction. The camera 10 is provided with a pinion 22 suitably disposed on a thumb wheel 24 so that rotation of the thumb wheel causes film to be advanced by engagement of the pinion 22 with the aforementioned externally accessible gear of the cassette.

A pinion 26 is disposed to be engagingly driven by teeth 25 on the thumb wheel 24. Coupled to the pinion 26 is a ratchet wheel 28 having ratchet-shaped teeth 30 peripherally disposed thereon. Clockwise rotation of the thumb wheel 24 attendant to film advance therefore will cause the ratchet wheel 28 to rotate in the opposite direction, i.e., counterclockwise as shown in the drawings. A one-way spring 32 is supported (by means not shown) to engage the teeth 25 of the thumb wheel 24. The spring is configured to provide an overriding pawl action, so that the thumb wheel 24 can only be rotated in the film-advancing direction. As a result of this, clockwise rotation of the ratchet wheel 28 is impossible, except for a deliberately introduced backlash between the teeth of the pinion 26 and the thumb wheel 24. The purpose of this backlash will be discussed subsequently.

FIGS. 1A and 1B show the camera mechanism in the cocked state. A slider 35 having a channel 36 at one end is disposed so that the channel slidingly engages a pin 38 mounted to the frame of the camera. The opposite end of the slider 35 is provided with a pin 40 to which is attached an energizing spring 42 connected to a pin 44 on the camera frame. The two pins 40,44 are disposed so that the normal tendency of the energizing spring 42 is to urge the slider to the left and counterclockwise as well. The counterclockwise limit of rotation is set by the engagement of a boss 46 integral with the slider 35, this boss being configured to slidingly ride along the surface of the transverse chamber wall 20.

Also integral with the slider 35 is a film-engaging cocking member 48 configured as an extension thereof so dimensioned as to pass through the edge perforations 50 of the film 52 of an inserted cassette. In the cocked state shown in FIGS. 1A and 1B, the slider 35 is at its extreme limit of rightward travel, and the spring 42 is attempting to urge the slider to the left. This is prevented because the oneway spring 32 prevents counterclockwise rotation of the thumb wheel 24 in the rewinding direction. As a result, the cocking member 48 attempts to move the film in a rewinding direction, but is held immobile by the tensile force of the film 52 acting against it. The camera is tripped simply by rotating the slider 35 slightly clockwise sufficiently to withdraw the cocking member 48 from the film perforation 50, as will be discussed next.

Figures 2A, 2B:
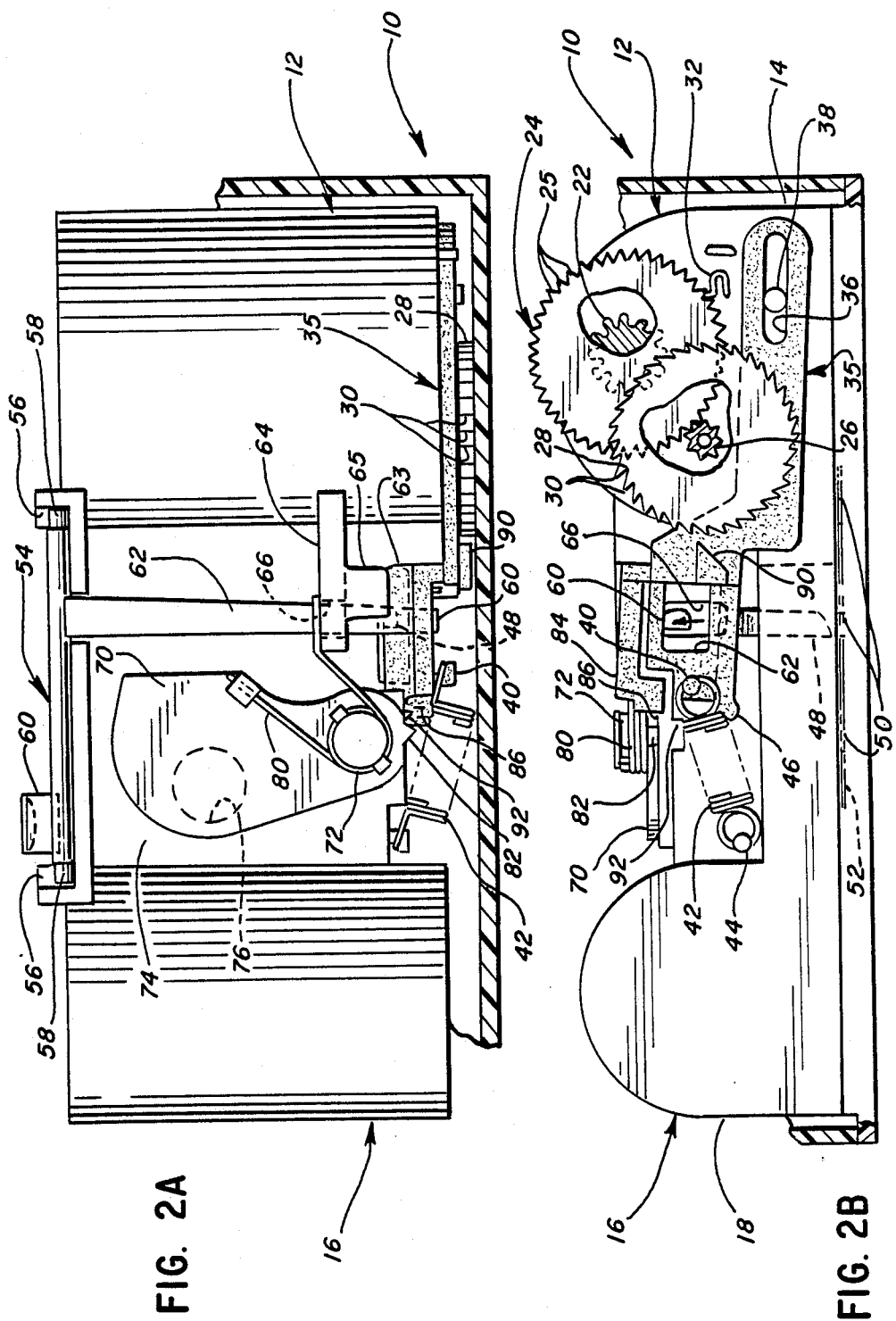
FIGS. 2A and 2B are partially cutaway rear and bottom views, respectively, of the camera shutter mechanism showing the camera mechanism in the immediate first phase of shutter tripping.
Figure 7:
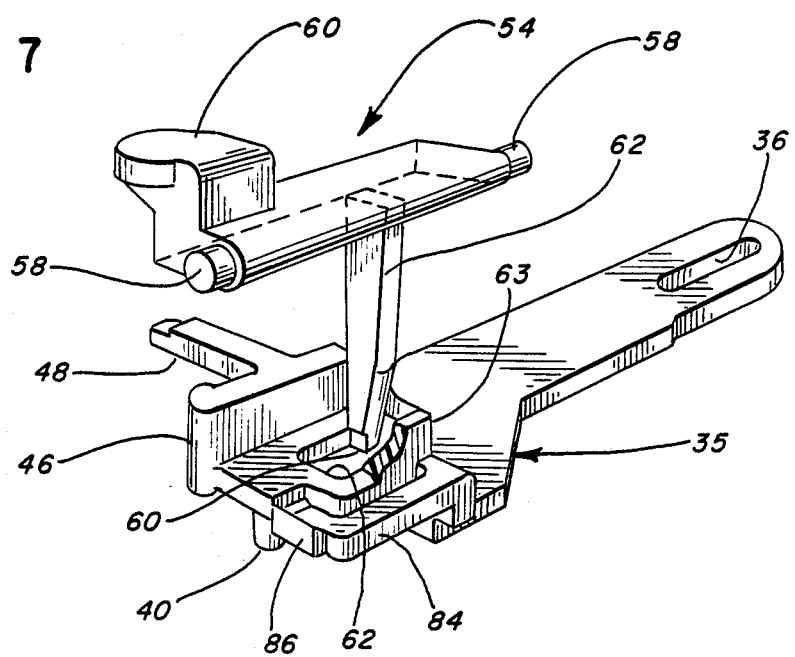
FIG. 7 is a perspective view generally from above showing the interrelationship of a slider and a manually operated shutter actuator.
Figure 8:
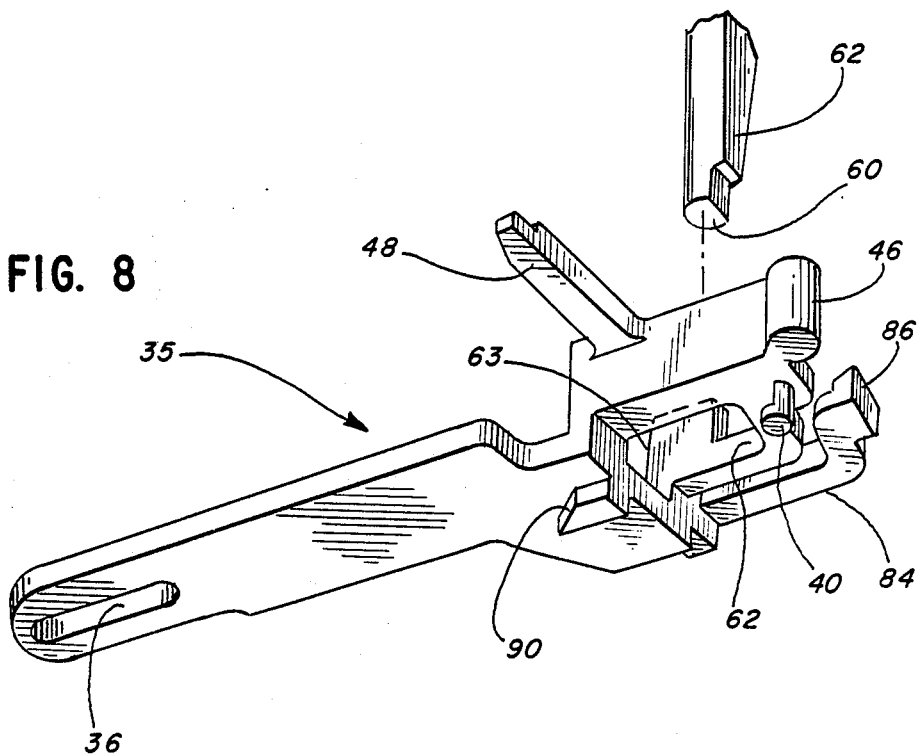
FIG. 8 is a perspective view of the slider member of FIG. 7 viewed generally from below.

Referring also to FIGS. 7 and 8, a shutter actuator 54 is rotatably mounted in bearing recesses 56—56 configured to receive end pins 58—58. A pushbutton-engaging member 60 is formed integrally with the shutter actuator 54, and is mounted offset with respect to the axis of the end pins 58 so that depression of this member will cause the shutter actuator 54 to rotate. The pushbutton engaging member 60 is positioned to be directly engaged by an externally actuated pushbutton (not shown in the drawings). Downwardly extending from the shutter actuator 54 is an actuator rod 62 integral therewith and having an end 60 disposed to reside within an aperture 62 at the left-hand end of the slider 35. A downwardly directed force on the pushbutton engaging member 60 will cause the end 60 of the shutter actuator 54 to move towards the rear of the camera, i.e., up, as shown in FIG. 2B. The immediate effect of this is to rotate the slider member 35 clockwise about the pin 38 so as to withdraw the cocking member 48 from the film perforation 50. The previously mentioned backlash in the gearing 24,26, as well as minor flexure of the one-way spring 32, permits the necessary slight clockwise rotation of the ratchet wheel 28 to allow for proper disengagement of a pawl 90 on the slider 35. The purpose of this pawl 90 will be subsequently discussed.

FIGS. 2A and 2B show the system immediately after such disengagement, and before significant leftward travel has begun. There is further provided a guide member 64 having an aperture through which the actuator rod 62 passes, the aperture 66 being configured to restrict the actuator rod against overtravel which might otherwise damage the system. The initial maximum clockwise rotation of the slider member 35 is set by the sliding engagement of an upwardly extending extension 63 (see also FIG. 7) of the slider engaging an arresting member 65 on the guide member 64.

FIGS. 3A and 3B show the actuation of the shutter mechanism by the subsequent leftward movement of the slider 35 in the rotated state. A shutter blade 70 rotatably mounted at one end to a post 72 mounted on a shutter board 74 is normally held in a closed counterclockwise position with respect to an exposure aperture 76 by a shutter spring 80. The shutter blade 70 is provided at a lower end thereof with an anvil 82. The slider 35 is further provided with an integral extension 84 having a sear face 86 at one end thereof. This sear face 86 is disposed to confront the anvil 82 when the slider 35 is in the rotated position shown. After driving the shutter blade 70 to the open position shown, the slider 35 continues moving to the left until its travel is terminated by engagement of the end of the channel 36 with the frame-mounted pin 38. The shutter blade 70 during this process returns to close the exposure aperture 76.

Figures 4A, 4B:
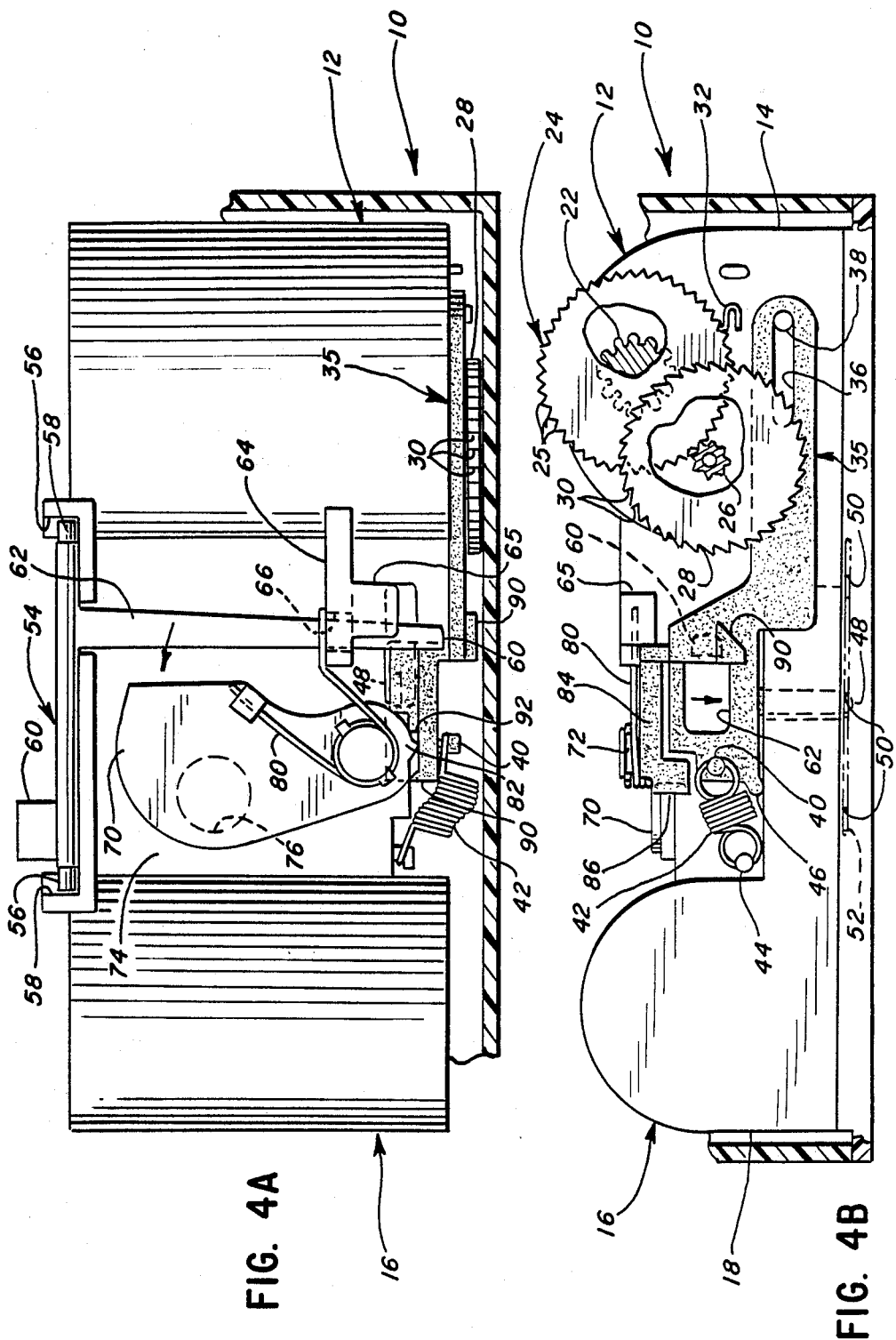
FIGS. 4A and 4B are partially cutaway rear and bottom views, respectively, of the camera shutter mechanism showing the system in a very early phase of film advance.

This entire operation is sufficiently rapid that the end 60 of the actuator rod 62 remains in the position shown in FIG. 3B. Upon release of finger pressure by the operator, rotating pressure from the actuator rod end 60 is relieved from the wall of the slider aperture 62; however, the cocking member 48 will prevent counterclockwise rotation of the slider 35 because of the abutment thereof against the film 52. At this point the operator then rotates the thumb wheel 24 clockwise to initiate a film-advancing operation. This will cause the film 52 to advance to the right, shortly thereafter presenting a new perforation in confronting relationship to the cocking member 48, whereupon the slider 35 is urged counterclockwise by the spring 42 to force the cocking member into the film peforation 50 as shown in FIGS. 4A and 4B. Thereafter, during rotation of the thumb wheel 24, the cocking member 48 is driven to the right by the film 52 to urge the slider 35 similarly to the right, against the increasing force of the energizing spring 42.

Termination of the film-advancing operation is shown in FIGS. 5A and 5B. Here the pawl 90, integral with the surface of the slider 35, has arrestingly engaged one of the teeth 30 of the ratchet wheel 28 to terminate the counterclockwise rotation thereof. This immediately freezes the thumb wheel 24 against further rotation, thus terminating a one-frame advance of the film 52.

With film advance so terminated, release of the operator's finger pressure from the thumb wheel 24 will cause the engaging spring 42 to attempt to move the film in the return direction to the left. This, however, is substantially prevented by the engagement of the oneway spring pawl 32 with the peripheral teeth 25 of the thumb wheel 24. The previously mentioned resilient properties of the one-way spring 32 and the backlash between pinion 26 and the thumb wheel 24 allow a very slight film return to the state shown in FIGS. 1A and 1B. The camera is now cocked and once again ready to take a picture.

To facilitate testing of the camera shutter operation when no film is present, a stationary sear face 92 is mounted on the shutter board 74 to lie in a confronting relationship with the sear face 86 on the slider 35 when the slider is drawn to the right in an unrotated condition. This situation is best shown in FIG. 5B. To cock the shutter with no film in the camera, and with the slider 35 in a deenergized state, i.e., fully counterclockwise, and completely to the left as shown in FIG. 4B, one may actuate the slider to a cocked condition simply by manually moving the end of the cocking member 48 to the right until the sear face 86 has moved over and beyond the stationary sear face 92. One would then reach the state of affairs shown, for example, in FIG. 5B. Release of this manual pressure will then allow the slider 35 to move slightly to the left until these two sear faces 86,92 are in abutting engagement, whereupon the slider is captively secured in a secondary cocked position. Shutter tripping may then be carried out as before, since clockwise rotation of the slider 35 will cause the sear face 86 on the slider member extension 84 to be moved out of a confronting relationship with respect to the stationary sear face 92, whereupon the slider member is released to travel to the left. Alternatively, the camera may be provided with a slidably attachable back cover which, when slid onto the camera, will automatically engagingly move the cocking member 48 to the right.

A slight modification of the system shown may be carried out to provide for an alternative form of shutter release mechanism. Thus, with reference to FIGS. 1A and 1B, the sear 92 may be displaced sufficiently to the right to arrestingly engage the sear face 86 on the slider 35 to hold it in the cocked position shown in FIGS. 1A and 1B. In such a case, the tensile force of the spring 42 no longer acts on the film 50 through the film-engaging extension 48, this pressure being relieved by the above-mentioned sear face engagement. The length of the cocking member 48 and the width of the stationary sear element 92 must be correspondingly adjusted so that the cocking member 48 disengages from the film 52 before the sear elements 86, 92 disengage. This variant has the advantage of providing for a somewhat more consistent delivery of impulse to the shutter blade 70.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. In a still camera having a camera body adapted to accept a film cassette, a shutter, a shutter-actuating slider member having a shutter striker portion for striking said shutter to momentarily move it to a light-passing position, spring means for biasing said slider member toward a shutter-striking position, slider member mounting means for supporting said slider member for movement between an initial fully energized position where said spring means is stressed said shutter-striking position, a film perforation engaging member affixed to said slider member and adapted to enter a film perforation and be moved by the film to return the slider member to said energized position during a film winding operation, means for retaining said slider member at said energized position after film advance when a cassette is installed, manually operated release means for releasing said slider member from said energized position, film winding means including means configured for engagement with an inserted film cassette for advancing the film, and film wind termination means for locking said film winding means against further advancing operation when said slider member is moved to said energized position, said slider member being movable in a direction laterally of its direction of movement between said initial energized position and said shutter-striking position, the movement of said slider member in said lateral direction moving said film perforation engaging member into and out of a film perforation, said release means being movable by the operator from an initial to a picture-taking position to move said slider member in said lateral direction to remove said film perforation engaging member from a film perforation to enable said slider member to move from its energized toward said shutter-striking position, the improvement comprising:

slider member latching means including a first latching shoulder portion affixed to said slider member and a second latching shoulder portion affixed to said housing, said latching shoulder portions being disposed for confronting one-way latching engagement at a point immediately prior to complete film advance to prevent return motion beyond said point of said slider member under the force of said biasing spring, and further configured so that a given degree of lateral movement of said film perforation engaging member from said film-engaging position towards a withdrawn position moves said first latching shoulder portion out of confrontation with said second latching shoulder portion.

2. The camera of claim 1 wherein said latching shoulder portions and said film-engaging member are configured so that when said slider member is moved laterally to a position where said film perforation engaging member is barely withdrawn from a film perforation, said shoulder portions are no longer in a confronting relationship.

3. The camera of claim 1 wherein said latching shoulder portions and said film-engaging member are configured so that when said slider member is moved laterally to a position where said film-engaging member is barely withdrawn from a film perforation, said shoulder portions remain in at least a partial confronting relationship reqiring further lateral movement of said slider member to place said shoulder locking portions in a non-confronting relationship.

4. The camera of claims 1, 2, or 3 wherein said slider member locking shoulder portion is disposed to serve as said shutter-striking portion.

5. The camera of claima 1, 2, or 3 further including pivoting means for allowing said lateral movement as a pivoting of said slider member from an initial position to a rotatively displaced position, and wherein said release member is coupled to pivot said slider member from said initial to said displaced position to move said film perforation engaging member out of said engagement with said film perforation, said slider member biasing spring is disposed to urge said slider member from said rotated to said unrotated position thereof, and said release means includes a release member disposed to pivot said slider member so as to move said film perforation engaging member out of engagement with said film perforation to release said slider member from engagement therewith.

6. The camera of claims 1, 2, or 3, wherein said film perforation engaging member is disposed for manual access when no cassette is installed so as to be urgeable in said advancing direction beyond said point to cause said slider member to be held in an energized position at said point after such urging so as to be releasable therefrom by subsequent operation of said release means.

* * * * *